United States Patent
Halberstadt

(10) Patent No.: US 10,021,744 B2
(45) Date of Patent: Jul. 10, 2018

(54) DUAL OUTPUT POWER CONVERTER AND METHOD FOR OPERATING A DUAL OUTPUT POWER CONVERTER

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/374,562

(22) Filed: Dec. 9, 2016

(65) Prior Publication Data

US 2018/0168011 A1    Jun. 14, 2018

(51) Int. Cl.
- *H05B 33/08*     (2006.01)
- *H02M 3/335*     (2006.01)
- *H02M 1/14*     (2006.01)

(52) U.S. Cl.
CPC .......... *H05B 33/0815* (2013.01); *H02M 1/14* (2013.01); *H02M 3/33546* (2013.01)

(58) Field of Classification Search
CPC ...... H02M 1/14; H02M 1/425; H02M 1/4241; H02M 2001/0025; H02M 2007/4815; H02M 2007/4818; H02M 3/285; H02M 1/3376; H02M 1/33561; H02M 7/4826; H05B 33/0815; Y02B 70/1416
USPC ....... 315/291, 300, 302, 307; 363/13, 21.02, 363/65; 323/207
See application file for complete search history.

(56) References Cited

U.S. PATENT DOCUMENTS

| | | | |
|---|---|---|---|
| 6,822,881 B2 | 11/2004 | Elferich et al. | |
| 6,829,151 B2 | 12/2004 | Elferich et al. | |
| 7,944,716 B2 | 5/2011 | Halberstadt | |
| 8,049,439 B2 | 11/2011 | Zhao et al. | |
| 8,339,817 B2 | 12/2012 | Halberstadt | |
| 9,065,350 B2 | 6/2015 | Halberstadt | |
| 2002/0186026 A1 | 12/2002 | Elferich | |

(Continued)

FOREIGN PATENT DOCUMENTS

| | | |
|---|---|---|
| EP | 2547176 A1 | 1/2013 |
| EP | 3068027 A1 | 9/2016 |

(Continued)

OTHER PUBLICATIONS

Oruganti, Ramesh; "Resonant Power Processors, Part II—Methods of Control"; IEEE Transactions on Industry Applications, vol. IA-21, NO. 6; Nov./Dec. 1985; pp. 1461-1471.

(Continued)

*Primary Examiner* — Kretelia Graham
*Assistant Examiner* — Henry Luong

(57) ABSTRACT

A power converter and a method for controlling a power converter are disclosed. The method involves generating a common mode control signal and a differential mode control signal in response to a first error signal and a second error signal, wherein the first error signal is a function of the voltage/current at a first output of a dual output resonant converter and the second error signal is a function of the voltage/current at a second output of the dual output resonant converter. The method also involves adjusting the voltage/current at the first output of the dual output resonant converter and the voltage/current at the second output of the dual output resonant converter in response to the common mode control signal and the differential mode control signal.

17 Claims, 11 Drawing Sheets

(56) References Cited

U.S. PATENT DOCUMENTS

| 2011/0068757 A1* | 3/2011 | Xu ........................ H02M 3/158 |
| | | 323/271 |
| 2013/0016533 A1* | 1/2013 | Halberstadt ......... H02M 3/3376 |
| | | 363/21.02 |
| 2013/0187561 A1* | 7/2013 | Franck ............... H05B 33/0815 |
| | | 315/201 |

FOREIGN PATENT DOCUMENTS

| WO | 2005112238 A1 | 11/2005 |
| WO | 2009004582 A1 | 1/2009 |

OTHER PUBLICATIONS

Singh, Ajit et al; "Analysis of single-inductor dual-output converter in buck and boost mode with voltage mode control"; IEEE Conference on Power Systems; pp. 1-6; 03/04/20.

* cited by examiner

| vcm | vdm | Iout1 at vcm,vdm | Iout2 at vcm,Vdm | Iout1 at vcm+0.05 | Iout2 at vcm+0.05 | Iout1 at vdm+0.05 | Iout2 at vdm+0.05 | δiout1_dvcm | δiout1_dvcm | δiout2_dVcm | δiout2_dVcm |
|---|---|---|---|---|---|---|---|---|---|---|---|
| 0 | 0.6 | 15.798 | 15.786 | 17.435 | 13.698 | 17.08 | 17.03 | 32.74 | 25.64 | -41.76 | 24.88 |
| 0 | 0.5 | 13.185 | 13.199 | 15.099 | 11.441 | 14.462 | 14.743 | 38.28 | 25.54 | -35.16 | 30.88 |
| 0 | 0.4 | 10.735 | 10.738 | 12.999 | 8.363 | 12.02 | 11.945 | 45.28 | 25.7 | -47.5 | 24.14 |
| 0 | 0.3 | 8.298 | 8.094 | 10.59 | 5.89 | 9.263 | 9.501 | 45.84 | 19.3 | -44.08 | 28.14 |
| 0 | 0.2 | 5.506 | 5.688 | 8.464 | 2.868 | 6.999 | 6.904 | 59.16 | 29.86 | -56.4 | 24.32 |
| 0 | 0.1 | 2.959 | 2.949 | 5.599 | 0.92 | 4.306 | 4.279 | 52.8 | 26.94 | -40.58 | 26.6 |

FIG. 4

DUAL OUTPUT POWER CONVERTER AND METHOD FOR OPERATING A DUAL OUTPUT POWER CONVERTER

BACKGROUND

For power converters operating at powers larger than approximately 100 watt (W) at full load, a resonant topology is interesting due to its high efficiency and small volumes/high power density. At power levels above 100 W, the extra cost compared to other topologies (e.g., an extra switch, extra secondary diode, resonant capacitor) is compensated for by additional advantages of resonant topology. There are several types of resonant converters, such as a series resonant converter, an LLC converter, and an LCC converter. Series resonant converter uses a resonant capacitor, Cr, and an inductor, Ls, as resonating components while LLC and LCC converters use three resonant components. For an LLC converter, the magnetizing inductance of the transformer takes part in the resonance, while for an LCC converter, an extra capacitor, which takes part in the resonance, is present at the secondary side of the transformer.

Resonant power supplies are being used in light emitting diode (LED) television applications to provide a low voltage output of about 12V DC that supplies the low voltage circuits and a high voltage output of around 165V that supplies the LED strings for the backlight of the display. Such resonant power supplies typically include a main regulation loop that senses the 12V output and regulates the power level of the converter in order to keep the 12V output constant While load varies. The 165V output follows the 12V by a more or less fixed ratio as set by the turns ratio of the resonant transformer. Because the 165V output is not regulated, the output voltage of the 165V output can vary considerably with load variations on both the 165V output and the 12V output. Thus, a second control stage is often used after the 165V output to provide for a more accurate supply voltage for the LED strings. However, a second control stage adds cost to such resonant power supplies.

SUMMARY

Embodiments of a power converter are disclosed. In an embodiment, a power converter includes a dual output resonant converter having a first output, a second output, a common mode control input, and a differential mode control input, wherein a voltage/current at the first output and a voltage/current at the second output are controlled in response to a common mode control signal received at the common mode control input and a differential mode control signal received at the differential mode control input. The power converter also includes a dual output controller having a first error signal input, a second error signal input, a common mode control output, and a differential mode control output, wherein the dual output controller is configured to generate the common mode control signal and the differential mode control signal in response to a first error signal received at the first error signal input and a second error signal received at the second error signal input, wherein the first error signal is a function of the voltage/current at the first output and the second error signal is a function of the voltage/current at the second output, and wherein the common mode control signal is output from the common mode control output and the differential mode control signal in output from the differential mode output.

In an embodiment of the power converter, the dual output controller is configured to generate the common mode control signal and the differential mode control signal in response to the first error signal and the second error signal by precalculating a control variable matrix and generating the common mode control signal and the differential mode control signal as a function of the first and second error signals and the control variable matrix.

In an embodiment of the power converter, the control variable matrix includes variables G1, G2, G3, and G4, wherein the common mode control signal and the differential mode control signal are generated as: Vcm=first error signal·G3+second error signal·G4; and Vdm=first error signal·G1+second error signal·G2.

In an embodiment of the power converter, (VcapH+VcapL)/2 of the dual output resonant converter is a function of the common mode control signal and Vbus/2−(VcapH−VcapL)/2 of the dual output resonant converter is a function of the differential mode control signal, wherein VcapH is the voltage at a specific node in the resonant tank of the dual output resonant converter when a high side switch of the dual output resonant converter is on and VcapL is the voltage at a specific node in the resonant tank of the dual output resonant converter when a low side switch of the dual output resonant converter is on. In a further embodiment, the dual output controller is configured Vcap control.

In an embodiment of the power converter, Vbus/2−(VcrH+VcrL)/2 of the dual output resonant converter is a function of the common mode control signal and (VcrH−VcrL)/2 of the dual output resonant converter is a function of the differential mode control signal, wherein VcrH is the voltage across a resonant capacitor of the dual output resonant converter when a high side switch of the dual output resonant converter is on and VcrL is the voltage across the resonant capacitor of the dual output resonant converter when a low side switch of the dual output resonant converter is on. In a further embodiment, the dual output controller is configured Vcr control.

In an embodiment of the power converter, the power converter further includes a first compare circuit that generates the first error signal in response to a comparison between the voltage/current at the first output and a first reference voltage/current and a second compare circuit that generates the second error signal in response to a comparison between the voltage/current at the second output and a second reference voltage/current.

In an embodiment, a power supply includes the power converter and further includes a low power mode.

In an embodiment, a power supply includes the power converter and the dual output resonant converter is configured to provide a voltage at the first output of approximately 12 volts and to provide a voltage at the second output of approximately 165 volts.

In an embodiment, a power supply for a display device includes the power converter and the dual output resonant converter is configured to provide a voltage at the first output of approximately 12 volts and to provide a voltage at the second output to drive LEDs strings for backlighting of the display device.

A method for controlling a power converter is also disclosed. The method involves generating a common mode control signal and a differential mode control signal in response to a first error signal and a second error signal, wherein the first error signal is a function of the voltage/current at a first output of a dual output resonant converter and the second error signal is a function of the voltage/current at a second output of the dual output resonant converter. The method also involves adjusting the voltage/current at the first output of the dual output resonant converter and the voltage/current at the second output of the dual output resonant converter in response to the common mode control signal and the differential mode control signal.

In an embodiment of the method, generating the common mode control signal and the differential mode control signal in response to the first error signal and the second error signal involves precalculating a control variable matrix and generating the common mode control signal and the differential mode control signal as a function of the first and second error signals and the control variable matrix.

In an embodiment of the method, the control variable matrix includes variables G1, G2, G3, and G4, and wherein the common mode control signal and the differential mode control signal are generated as: Vcm=first error signal·G3+second error signal·G4; and Vdm=first error signal·G1+second error signal·G2.

In an embodiment of the method, (VcapH+VcapL)/2 of the dual output resonant converter is a function of the common mode control signal and Vbus/2−(VcapH−VcapL)/2 of the dual output resonant converter is a function of the differential mode control signal, wherein VcapH is the voltage at a specific node in the resonant tank of the dual output resonant converter when a high side switch of the dual output resonant converter is on and VcapL is the voltage at a specific node in the resonant tank of the dual output resonant converter when a low side switch of the dual output resonant converter is on.

In an embodiment of the method, Vbus/2−(VcrH+VcrL)/2 of the dual output resonant converter is a function of the common mode control signal and (VcrH−VcrL)/2 of the dual output resonant converter is a function of the differential mode control signal, wherein VcrH is the voltage across a resonant capacitor of the dual output resonant converter when a high side switch of the dual output resonant converter is on and VcrL is the voltage across the resonant capacitor of the dual output resonant converter when a low side switch of the dual output resonant converter is on.

In an embodiment of the method, the first error signal is generated in response to a comparison between the voltage/current at the first output and a first reference voltage/current and the second error signal is generated in response to a comparison between the voltage/current at the second output and a second reference voltage/current.

Another embodiment of a power converter is disclosed. The power converter includes a dual output resonant converter having a first output, a second output, a common mode control input, and a differential mode control input, wherein a voltage/current at the first output and a voltage/current at the second output are controlled in response to a common mode control signal received at the common mode control input and a differential mode control signal received at the differential mode control input. The power converter also includes a first compare circuit that generates a first error signal in response to a comparison between the voltage/current at the first output and a first reference voltage/current and a second compare circuit that generates a second error signal in response to a comparison between the voltage/current at the second output and a second reference voltage/current. The power converter also includes a dual output controller including a first error signal input connected to receive the first error signal, a second error signal input connected to receive the second error signal, a common mode control output to output the common mode control signal, and a differential mode control output to output the differential mode control signal, wherein the dual output controller is configured to generate the common mode control signal and the differential mode control signal in response to the first error signal and the second error signal.

In an embodiment of the power converter, the dual output controller is configured to generate the common mode control signal and the differential mode control signal in response to the first error signal and the second error signal by precalculating a control variable matrix and generating the common mode control signal and the differential mode control signal as a function of the first and second error signals and the control variable matrix.

In an embodiment of the power converter, the control variable matrix includes variables G1, G2, G3, and G4, and wherein the common mode control signal and the differential mode control signal are generated as: Vcm=first error signal·G3+second error signal·G4; and Vdm=first error siganl·G1+second error signal·G2.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4 is a table of some of the data points in the graph of FIG. 3 along with some corresponding partial derivative values.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
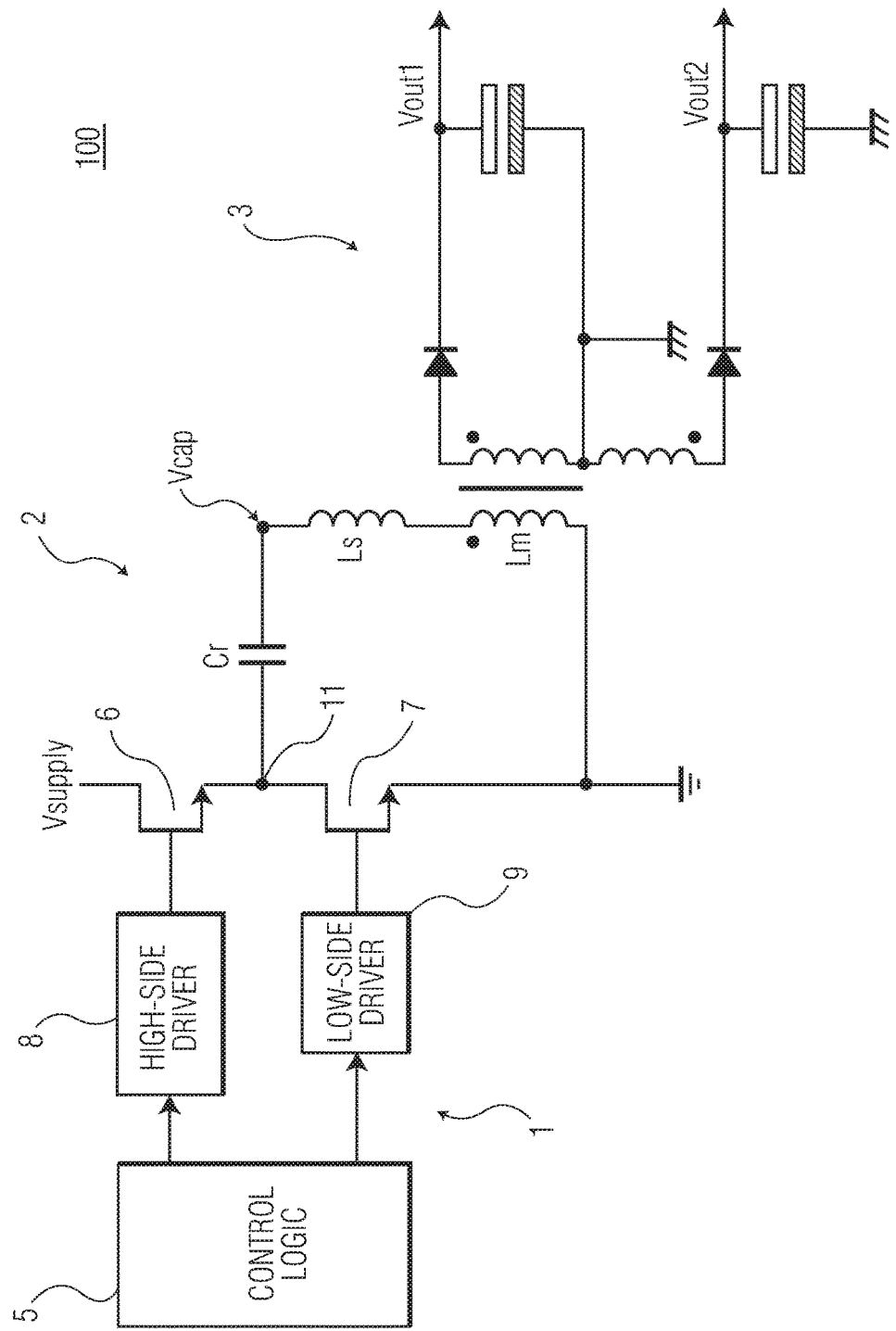
FIG. 1 depicts and embodiment of a dual output resonant converter.

Dual output resonant converters are known. Examples of dual output resonant converters are disclosed in U.S. Pat. No. 6,822,881 and U.S. Pat. No. 6,829,151. An embodiment of a dual output resonant converter 100 is depicted in FIG. 1. In the embodiment of FIG. 1, the circuit is a resonant LLC converter that includes a resonant capacitor, Cr, and inductors, Ls, and magnetizing inductance, Lm, which are components that form part of a resonant circuit or a resonant tank. Transformer and rectifier circuits are used to create DC output voltages, Vout1 and Vout2. The output current can be made continuous by adding a series inductance (not shown). In an embodiment of FIG. 1, the circuit includes three parts. A first part 1 is the control part, which includes control logic, 5, for generating control signals for opening and closing the switches, 6 and 7, by means of a high-side driver (HSD) 8 and a low-side driver (LSD) 9, respectively. A second part 2 is the primary circuit and a third part 3 is the secondary circuit. The second part includes the resonant capacitor, Cr, and the inductors, Ls and Lm. The resonant converter is connected to a voltage supply, Vsupply, (also referred to herein as Vbus) so that electrical energy may be supplied to a load that, for example, may be connected to output terminals at the secondary side. In an embodiment, the switches, 6 and 7, are series-arranged, controllable switches that are connected to the voltage supply, Vsupply, the first switch being a high-side switch (HSS), the high-side switch being connected at one leg to the voltage supply, Vsupply, the second switch being a low-side switch (LSS), the low-side switch being connected at one leg to ground. Also, an embodiment with a full bridge configuration can be envisioned. The third part may include diodes and capacitors as is known in the field.

The dual output resonant converter 100 is typically controlled by a frequency with a 50% duty cycle. The output power of the converter may be controlled by varying the signal frequency. It is also possible to use a duty cycle different from 50%, In this case, the duty cycle also influences the output power. A drawback to frequency and duty cycle based control may be that for certain operating points it becomes difficult to regulate the system to the desired operating point because of changes in gain factors due to non linear behavior of a frequency or duty cycle controlled resonant converter and even changes in polarity.

Various techniques for operating resonant converters are known. One technique as disclosed in U.S. Pat. No. 7,944,716, which is incorporated by reference herein, involves combining control of the duty cycle and the frequency in such a way that a smooth regulation of the output power can be realized. For example, the resonant converter is not controlled by frequency and duty cycle directly, but with current and voltage at the primary side of the transformer. In an embodiment, current and voltage in the resonant tank, e.g., Iprim and Vcap, are compared each conduction interval with two control values such that the resonant converter is controlled in a cycle-by-cycle manner. In an embodiment, the current, Iprim, is the current flowing in the resonant tank in response to the opening and closing of the switches. Measurement of the current may be provided in various different ways, e.g., from the voltage over a sense resistor, the current in a switch, etc. The current, Iprim, is also referred to as the primary current. Vcap is also referred to as the capacitor voltage, which is the voltage at a predetermined point, such as the node indicated as "Vcap" in FIG. 1. In the example of FIG. 1, the voltage at node Vcap is defined as Vhb−Vcr, where Vhb is the voltage at the half bridge node 11 and Vcr is the voltage across the resonant capacitor. In an example operation, for each half cycle, the conducting primary switch is switched off when the voltage, Vcap, crosses a predefined value for each half cycle (e.g., VcapH for high-side switch turn off and VcapL for low-side switch turn off). By controlling the primary switches in this way, it is possible to get an almost linear relationship between a control parameter and output power.

Further, it is possible to define a differential mode term, Vdm, and a common mode term, Vcm, for use in controlling a resonant converter. For example, the differential mode term may be expressed as Vdm=Vbus/2−(VcapH−VcapL)/2 and the common mode term may be expressed as Vcm= (VcapH+VcapL)/2. Using the differential mode term and the common mode term, it is possible to control both the total power that is delivered to the output using the differential mode term, Vdm, while the difference in output power that is delivered to the output during each half cycle is determined by the common mode term, Vcm.

It is possible to use the voltage across a resonant capacitor, Vcr, or the voltage at the node Vcap to implement a control scheme that utilizes a differential mode term and a common mode term. The techniques involving Vcap and Vcr can yield similar control functionality. However, a difference between using Vcap control versus Vcr control is that the average value of Vcap is per definition zero, while for Vcr, a DC component, Vbus/2, is present, which makes it possible to use a capacitive divider to divide Vcap down to a low voltage signal that is compatible with a low voltage controller integrated circuit (IC). While the DC component is Vbus/2 for Vcr control at a 50% duty cycle, for duty cycles other than 50%, the DC component is Vbus/2× duty cycle, where the duty cycle is the high-side switch conduction time divided by the period time.

Additional techniques for operating resonant converters that use a differential mode term, Vdm, and a common mode term, Vcm, to control a resonant converter are disclosed in U.S. Pat. No. 9,065,350, and European Patent Application No. 11250662.1 (Published as EP 2 547 176 A1, on Jan. 16, 2013), which are incorporated by reference herein.

In addition to the 50% duty cycle modes or "high power modes," it is also known that it is possible to use "low power modes" to control a resonant converter. Various examples of low power modes for controlling resonant converters are disclosed in for example, U.S. Pat. No. 8,339,817, International Patent Applications Published under the Patent Cooperation Treaty (PCT) as publication numbers WO 2005/112238 and WO 2009/004582, and European Patent Application No. 15159086.6 (Published as EP 3 068 027 A1, on Mar. 13, 2015). In such low power modes, part of a switching sequence is similar to the high power mode, while during another pail of the cycle, the resonant tank is in a mode where no energy is converted and where also relatively few losses are produced.

As described above, resonant power supplies are being used in LED television applications to provide a low voltage output of about 12V DC that supplies the low voltage circuits and a high voltage output of around 165V that supplies the LED strings for the backlight of the display. Some known power supplies developed for such applications require a second control stage after the 165V output to provide for a more accurate supply voltage for the LED strings. However, a second control stage adds cost to such resonant power supplies. In accordance with an embodiment of the invention, a power converter with a dual output resonant converter is disclosed that does not need a second stage controller for the 165V output. The power converter is controlled using a "capacitor voltage" control technique so that the two outputs of the dual output resonant converter can be controlled independently of each other. In an embodiment, a differential mode control signal, Vdm, and a common mode control signal, Vcm, are used to independently control the two outputs of a dual output resonant converter. In particular, the differential mode control signal, Vdm, and the common mode control signal, Vcm, are adjusted in response to error signals that are generated as a function of the output voltage and/or current of each of the two outputs. For example, a first (e.g., linear) combination of the first and second error signals is used to generate a differential mode control signal and a second (e.g., linear) combination of the first and second error signals is used to generate a common mode control signal.

Figure 2:
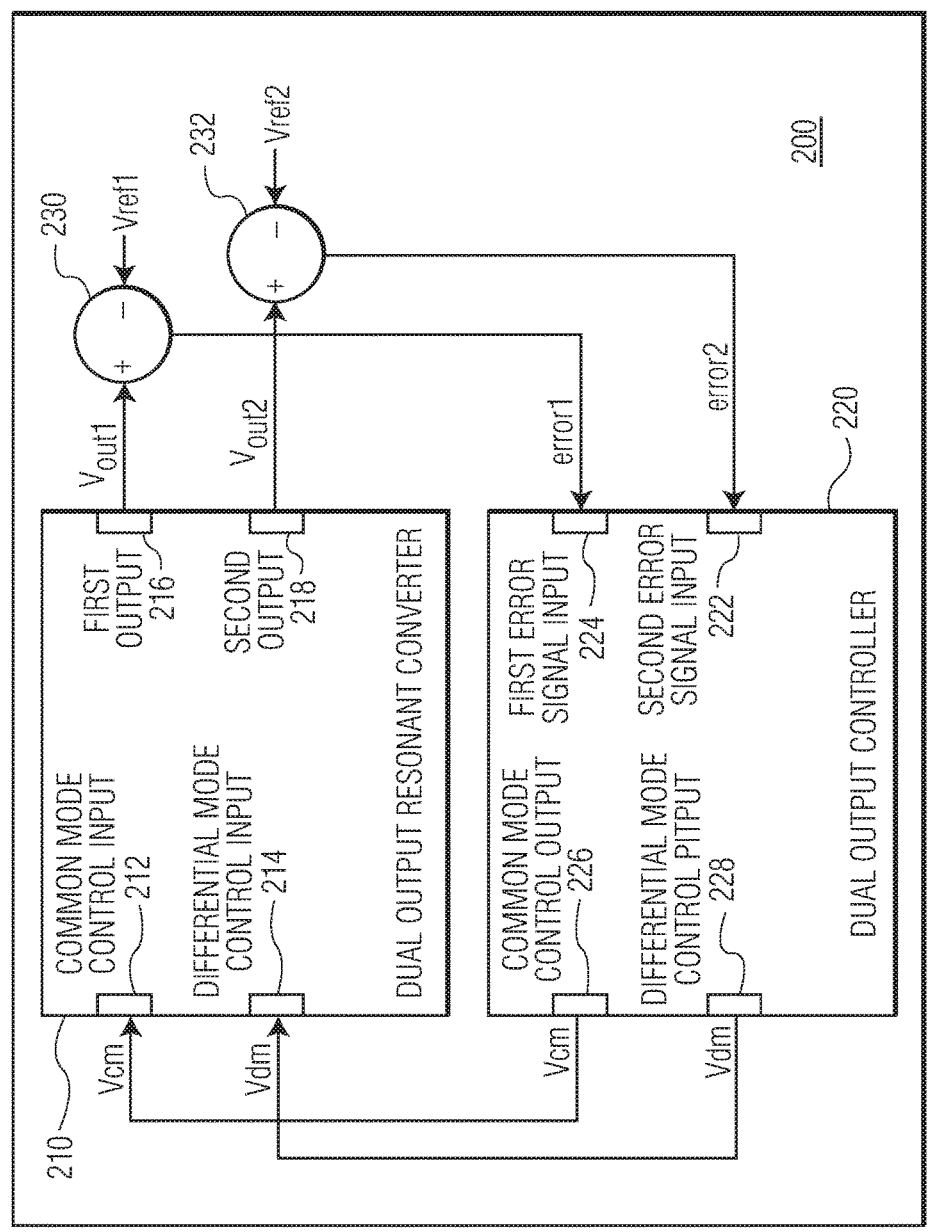
FIG. 2 is a block diagram of an example of a power converter that includes a dual output resonant converter, a dual output controller, and first and second compare units in accordance with an embodiment of the invention.

A technique for controlling a dual output resonant converter is first described with reference to FIG. 2. FIG. 2 is a block diagram of an example of a power converter 200 that includes a dual output resonant converter 210, a dual output controller 220, and first and second compare units 230 and 232 in accordance with an embodiment of the invention. The dual output resonant converter, the first and second compare units, and the dual output controller form a feedback loop that is used to independently control the voltage and/or current at the two outputs of the dual output resonant converter. For example, in an LED television application, the outputs can be independently controlled to provide a 12V output and a 165V output (e.g., within ±10% or within ±5% of the target output) that can be used to drive the different components of an LED television. The dual output resonant converter includes a common mode control input 212, a differential mode control input 214, a first output 216, and a second output 218. The common mode control input receives a common mode control signal, Vcm, and the differential mode control input receives a differential mode control signal, Vdm, while the first output provides an output voltage, Vout1, and the second output provides an output voltage, Vout2. It should be noted that the outputs could also be viewed in terms of an output current, Iout1 and Iout2, respectively.

The compare units 230 and 232 are configured to compare a voltage to a reference voltage to generate an error signal that can be processed by the dual output controller 220. In an embodiment, the error signals reflect the difference between the output voltage and a reference voltage. For example, the compare units are used so that the 12V and 165V outputs can be transformed to lower voltage signals that can be managed by an IC-based dual output controller, which typically operates at voltages in the range of about 0.5-3 volts. The first compare unit is configured to compare the output, Vout1, from the first output to a first reference signal, Vref1, to generate a first error signal, error1, and the second compare unit is configured to compare the output, Vout2, from the second output to a second reference signal, Vref2, to generate a second error signal, error2. Although the compare units and corresponding signals are described in terms of voltage, the compare units could be configured as current compare units with corresponding current based signals, e.g., Iout1, Iout2, Iref1, and Iref2.

The dual output controller 220 includes a first error signal input 222, a second error signal input 224, a common mode control output 226, and a differential mode control output 228. The first error signal input receives the first error signal, error1, and the second error signal input receives the second error signal, error2. The common mode control output outputs the common mode control signal, Vcm, and the differential mode control output outputs the differential mode control signal, Vdm.

A power converter with a dual output resonant converter can be controlled based on the voltage at the node, Vcap, which is referred to herein as "Vcap control" or based on the voltage across the resonant capacitor, which is referred to herein as "Vcr control." In an embodiment, the voltage across the resonant capacitor, Vcr, may also include a voltage drop across a sense resistor, Rsense, but as the sense resistor is typically only in the 100 mV range while Vcr is in a range that is greater than 100V, the voltage drop attributable to the sensor resistor is insignificant. Depending on the placement of the resonant capacitor, e.g., in series with the switching node or in series with the ground node, a different signal shape occurs, so the common anode control signal, Vcm, and the differential mode control signal, Vdm, are defined slightly different between both configurations, but the basic principle applied for power converter control is the same. For example:, for Vcap control:

$$VcapH=Vbus/2+Vcm-Vdm;$$

$$VcapL=-Vbus/2+Vcm+Vdm;$$

or written in another way;

Vdm=Vbus/2−(VcapH−VcapL)/2 controls Pout1+Pout2 with only a small residual effect on Pout1−Pout2;

Vcm =(VcapH+VcapL)/2 controls Pout1−Pout2 with only a small residual effect on Pout1+Pout2;

where Pout1 is the power delivered on the first output 216 of the dual output resonant converter 210 and Pout2 is the power delivered on the second output 218 of the dual output resonant converter.

For Vcr control compared to Vcap control, a one-to-one relationship exists between values, e.g., for every value of VcapH and VcapL one value exists for VcrH and VcrL. For example, for Vcr control:

Vhb=Vcap+Vcr so;

VcapH level is relevant when the high-side switch is on, then Vhb=Vbus so Vcr=Vhb−Vcap gives:

VcrH=Vbus−VcapH;

VcapL level is relevant when low-side switch is on, then Vhb=0 so Vcr=Vhb−Vcap gives:

VcrL=−VcapL;

Vcm=(VcapH+VcapL)/2=((Vbus−VcrH)+(−VcrL))/2=Vbus/2−(VcrH+VcrL)/2.

Using Vcap control, the common mode control signal, Vcm, does not depend on Vbus, while with Vcr control, the common mode control signal does depend on Vbus, e.g., Vbus/2. Thus, in an embodiment that uses Vcap control, the differential mode control signal is defined as Vdm=Vbus/2−(VcapH−VcapL)/2 and the common mode term is defined as Vcm=(VcapH+VcapL)/2 and in an embodiment that uses Vcr control, the differential mode control signal is defined as Vdm=(VcrH−VcrL)/2 and the common mode term is defined as Vcm=Vbus/2−(VcrH+VcrL)/2. As is described below, in an embodiment, the dual output controller functions the same for both Vcap control and Vcr control.

A consideration in choosing to use Vcap control or Vcr control is related to the specific implementation. For example, with Vcap control, the average voltage of Vcap is zero, Vcap=0 (because the voltage is sensed across an inductor). Therefore, it is easy to use a capacitive divider to translate the amplitude of Vcap (e.g., a few 100V) to IC levels of, for example, a few volts. A capacitive divider cannot transfer DC information, but because the DC information is zero per definition, it is also not required. In an embodiment, the DC term can be set to zero, for example, by connecting a large resistor between the capacitive divider and the ground reference that VcapH and VcapL are referenced to. Vcr control may be selected so that a resonant capacitor can be connected to ground at one side, which enables the resonant capacitor to be split into two capacitors, which may give less ripple current in the supply voltage, Vsupply, also referred to as Vbus.

As described above, the differential mode control signal, Vdm, and a common mode control signal, Vcm, are used to independently control the two outputs of a dual output resonant converter. In particular, the differential mode control signal and the common mode control signal are adjusted in response to error signals, error1 and error2, that are generated as a function of the output voltage and/or current, Vout1/Iout1 and Vout2/Iout2, of each of the two outputs. An example of a technique for deriving the functional relationships between Vcm, Vdm, error1, and error2 is described below.

Figure 3:
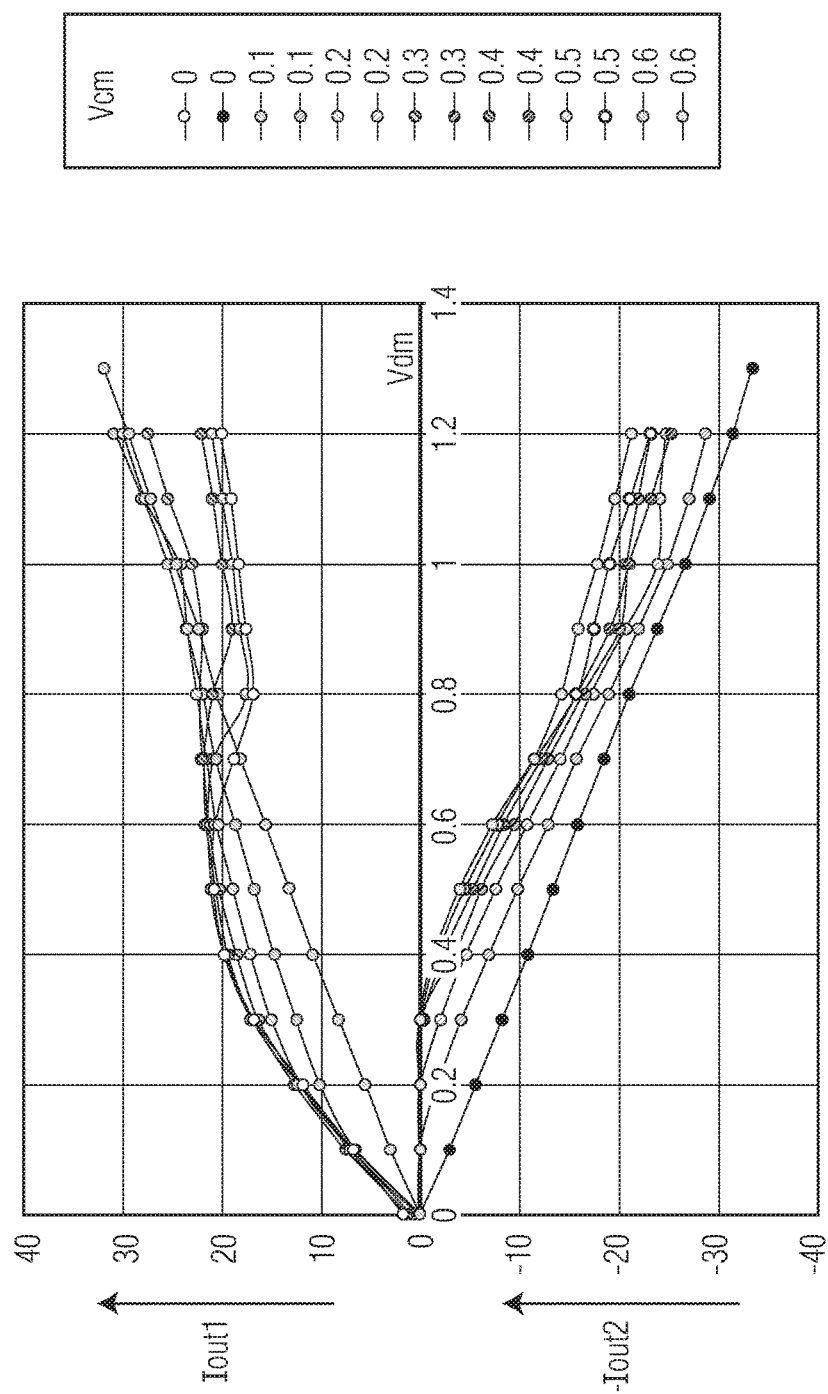
FIG. 3 is a graph of simulation results for a power converter that includes a dual output resonant converter.

In the power converter 200 depicted in FIG. 2, the error signal generated for one of the outputs should drive the combination of Vcm and Vdm in the proper ratio such that only power to the desired output changes and the power to the other output stays constant. For example, the error signal corresponding to the first output, error1, should drive changes to the output at the first output, Vout1, of the dual output resonant converter with little effect (e.g., ±1% change) on the output at the second output, Vout2, of the dual output resonant converter while the error signal corresponding to the second output, error2, should drive the changes to the output at the second output, Vout2, of the dual output resonant converter with little effect on the first output, Vout1, of the dual output resonant converter. Such a control scheme is referred to herein as "orthogonal" control. In order to achieve orthogonal control, in an embodiment, a first step is to describe how the output current (e.g., Iout1 and Iout2) at each output changes with changes in Vcm and Vdm. The change in output current at each output as a function of changes in Vcm and Vdm can be described as the total differential of each output based on partial derivatives as follows:

dIout1=δiout1_dVcm·dVcm+δiout1_dVdm·dVdm dIout2=δiout2_dVcm·dVcm+δiout2_dVdm·dVdm These partial derivatives can then be determined for a particular configuration of a dual output resonant converter operating over a set of known operating points. FIG. 3 is a graph of simulation results for a power converter that includes a dual output resonant converter as described above with reference to FIGS. 1 and 2. In the example of FIG. 3, the output current at two outputs, Iout1 and −Iout2, is plotted for different values of the common mode control signal, Vcm, and for different values of the differential mode control signal, Vdm. In the example of FIG. 3, Vcm and Vdm correspond to the signal derived from the Vcap or Vcr node by a voltage divider in order to get voltages at a scale applicable to an IC input. For example, the output currents, Iout1 and Iout2, are plotted over a range of common mode control signals, Vcm, from 0-0.6V and over a range of differential mode controls signals, Vdm, from 0-1.4V. FIG. 4 is a table of some of the data points in the graph of FIG. 3 along with some corresponding partial derivative values.

In an embodiment, it is desired to determine the change in the differential mode control signal, Vdm, and the change in the common mode control signal, Vcm, needed in order to get a certain output current change at only one output (e.g., either Iout1 or Iout2), while leaving the output current at the other output unchanged, e.g., unchanged within a range of about ±1% of full power of the output. In an embodiment, the differential mode control signal, Vdm, and the common mode control signal. Vcm, can be solved from the following set of equations:

dIout1=δiout1_dVcm·dVcm+δiout1_dVdm·dVdm dIout2=δiout2_dVcm·dVcm+δiout2_dVdm·dVdm Which gives, the matrix operation:

$$\begin{pmatrix} dIout1 \\ dIout2 \end{pmatrix} = \begin{pmatrix} \delta iout1\_dVcm & \delta iout1\_dVdm \\ \delta iout2\_dVcm & \delta iout2\_dVdm \end{pmatrix} \cdot \begin{pmatrix} dVcm \\ dVdm \end{pmatrix}$$

Using the data in the example of FIGS. 3 and 4, at the operating point Vcm=0 and Vdm=0.4, the derivatives are determined as:

δiout1_dVcm=45.28  δiout1_dVdm=25.7

δiout2_dVcm=−47.5  δiout2_dVdm=24.14

The above values can e applied to the equations below:

$$dVcm = \frac{\begin{vmatrix} dIout1 & \delta out1\_dVdm \\ diout2 & \delta out2\_dVdm \end{vmatrix}}{\begin{vmatrix} \delta iout1\_dVcm & \delta iout1\_dVdm \\ \delta iout2\_dVcm & \delta iout2\_dVdm \end{vmatrix}}$$

and $$dVdm = \frac{\left|\begin{pmatrix} \delta out1\_dVcm & dIout1 \\ \delta iout2\_dVcm & dIout2 \end{pmatrix}\right|}{\left|\begin{pmatrix} \delta iout1\_dVcm & \delta iout1\_dVdm \\ \delta iout2\_dVcm & \delta iout2\_dVdm \end{pmatrix}\right|}$$

In an example, the changes needed in the values of the differential mode control signal, Vdm, and the common mode control signal, Vcm, to achieve an output current change of 1 amp in each output can be determined from the above equations being a function of (dIout1,dIout2). For example, the changes needed in the values of Vdm and Vcm are calculated as:

dVcm(1,0)=−11.107 ml dVcm(0,1)=10.433 ml dVcm(1,1)=−0.674 ml dVdm(1,0)=19.569 ml dVdm(0,1)=20.529 ml dVdm(1,1)=40,098 ml

Figure 5:
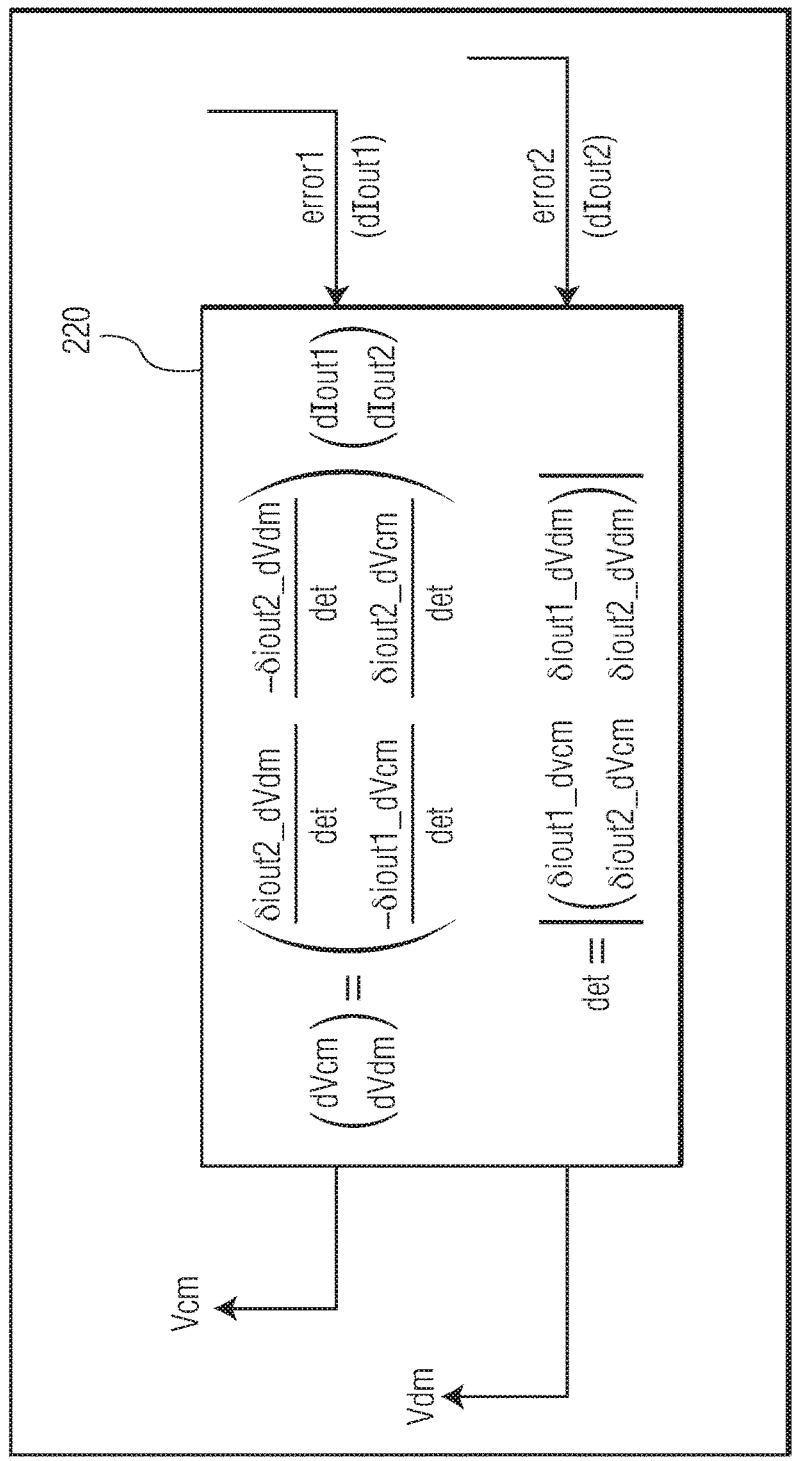
FIG. 5 illustrates an example of the control function that is performed by the dual output controller.

An example control function of an embodiment of the dual output controller 220 is illustrated in FIG. 5. As illustrated in FIG. 5, the common mode control signal, Vcm, and the differential mode control signal, Vdm, are generated as a function of the input error signals, error1 (monitored as dIout1) and error2 (monitored as dIout2). The values of the control parameters can be solved for and referred to in general as control parameters G1, G2, G3, and G4. The control parameters can be represented in a control parameter matrix of:

$$\begin{pmatrix} G1 & G2 \\ G3 & G4 \end{pmatrix}$$

With reference to FIG. 5, a determinant is used to solve the set of linear equations in a structural way, e.g., as the quotient of two determinants. The determinant can be expressed as:

$$\det = \left|\begin{pmatrix} \delta iout1\_dVcm & \delta iout1\_dVdm \\ \delta iout2\_dVcm & \delta iout2\_dVdm \end{pmatrix}\right| =$$

$$\delta iout1\_dVcm \cdot \delta iout2\_dVdm - \delta iout1\_dVdm \cdot \delta iout2 dVcm$$

And the set of equations can be solved as:

$dVcm(dIout2, dIout1) =$ $$\frac{dIout1 \cdot \delta iout2\_dVdm - dIout2 \cdot \delta iout1\_dVdm}{\delta iout1\_dVcm \cdot \delta iout2\_dVdm - \delta iout1\_dVdm \cdot \delta iout2\_dVcm}$$

$dVdm(dIout2, dIout1) =$ $$\frac{dIout2 \cdot \delta iout1\_dVdm - dIout1 \cdot \delta iout2\_dVcm}{\delta iout1\_dVcm \cdot \delta iout2\_dVdm - \delta iout1\_dVdm \cdot \delta iout2\_dVcm}$$

Given the simulated values identified above:

δiout1_dVcm=45.28 δiout1_dVdm=25.7

δiout2_dVcm=−47.5 δiout2_dVdm=24.14

The control parameters G1, G2, G3, and G4 for the particular configuration of the dual output resonant converter are precalculated as:

$$G1 = \frac{\delta iout2\_dVdm}{\det}$$

$G1 = 0.011$ $$G2 = \frac{-\delta iout1\_dVdm}{\det}$$

$G2 = -0.011$ $$G3 = \frac{-\delta iout2\_dVcm}{\det}$$

$G3 = 0.019$ $$G4 = \frac{\delta iout1\_dVcm}{\det}$$

$G4 = 0.019$

As shown above, a set of control parameters can be pre calculated for a particular configuration of a dual output resonant converter that is operated and/or simulated over a known set of operating points. In an embodiment, the control parameters G1 and G2 are used by the dual output controller to set the common mode control signal, Vcm, and the control parameters G3 and G4 are used by the dual output controller to set the differential mode control signal, Vdm. In an embodiment, for symmetry reasons, when adapting the feedback loop starting from a symmetrical operating point where both outputs are equally loaded, G1 and G2 should be opposite, while G3 and G4 should be equal. Although certain values for the control parameters G1, G2, G3, and G4 are found for an example power converter and an example set of operating points, it should be understood that the particular values of the control parameters are implementation specific. With the values of the control parameters predetermined, the values of the common mode control signal, Vcm, and the differential mode control signal, Vdm, can be generated using relatively simple calculations based on the error values, error1 and error2. Thus, the two outputs of the dual output resonant converter can be independently controlled in a feedback control loop that utilizes two inputs and very little additional control circuitry.

Figure 6A:
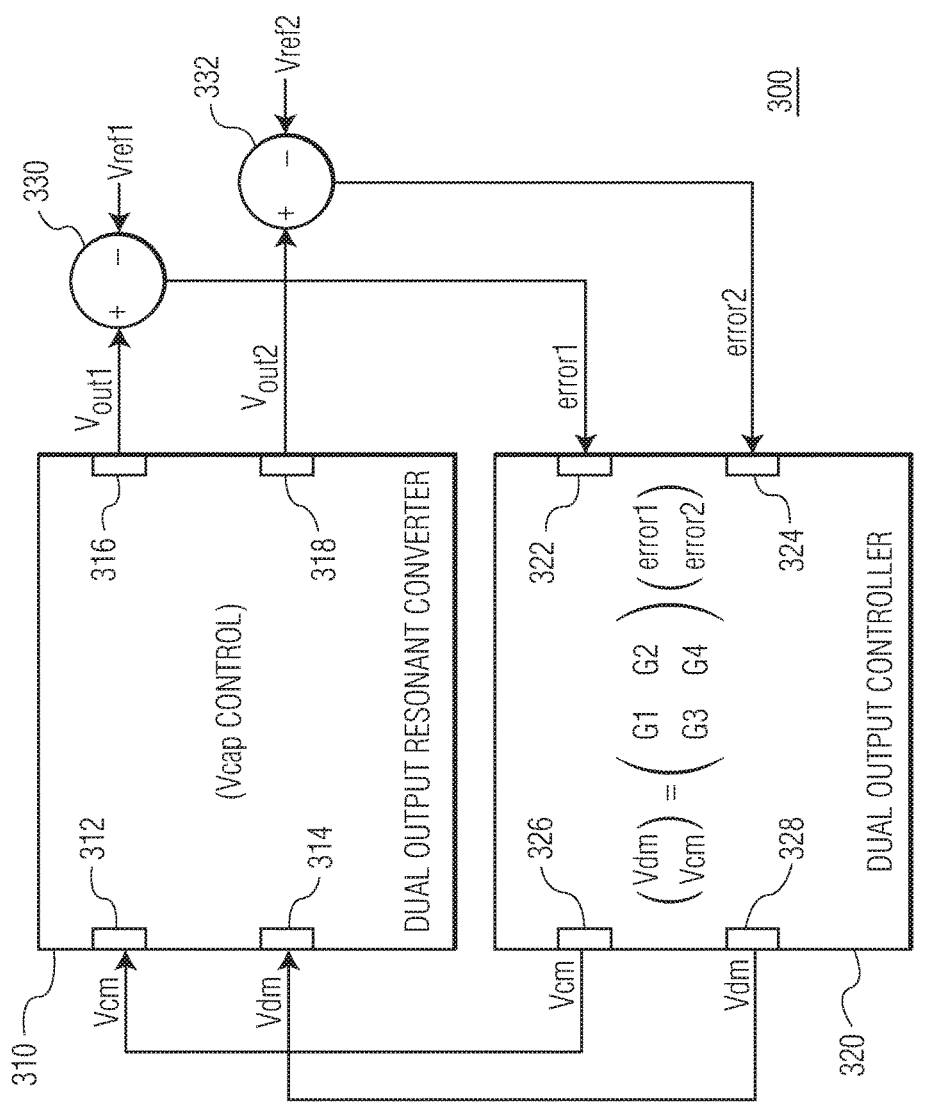
FIG. 6A is a block diagram of an example of a power converter that is configured for Vcap or Vcr control.

FIG. 6A is a block diagram of an example of a power converter 300 that is configured for Vcap control. The power converter can be similar to or the same as the power converter 200 of FIG. 2 and includes a dual output resonant converter 310, a dual output controller 320, and first and second compare units 330 and 332 in accordance with an embodiment of the invention. The dual output resonant converter, the first and second compare units, and the dual output controller form a feedback loop as described above with reference to FIG. 2. The dual output resonant converter includes a common mode control input 312, a differential mode control input 314, a first output 316, and a second output 318. The common mode control input receives a common mode control signal, Vcm, and the differential mode control input receives a differential mode control signal, Vdm, while the first output provides an output voltage, Vout1, and the second output provides an output voltage, Vout2. It should he noted that the outputs could also he viewed in terms of an output current, Iout1 and Iout2, respectively.

The compare units 330 and 332 are configured to compare a voltage to a reference voltage to generate an error signal. The first compare unit is configured to compare the output, Vout1, from the first output to a first reference signal, Vref1, to generate a first error signal, error1, and the second compare unit is configured to compare the output, Vout2, from the second output to a second reference signal, Vref2, to generate a second error signal, error2. Although the compare units and corresponding signals are described in terms of voltage, the compare units could be configured as current compare units, with corresponding current based signals or as power based compare units for power-based regulation of the power converter.

The dual output controller 320 includes a first error signal input 322, a second error signal input 324, a common mode control output 326, and a differential mode control output 328. The first error signal input receives the first error signal, error1, and the second error signal input receives the second error signal, error2. The common mode control output outputs the common mode control signal, Vcm, and the differential mode control output outputs the differential mode control signal, Vdm. As illustrated in FIG. 6A. the dual output controller generates the common mode control signal, Vcm, and the differential mode control signal, Vdm, in response to the error signals, error1 and error2. To generate the common mode control signal, Vcm, and the differential mode control signal, Vdm, the dual output controller is configured with a control parameter matrix of:

$$\begin{pmatrix} G1 & G2 \\ G3 & G4 \end{pmatrix}$$

and the control function can be expressed as:

$$\begin{pmatrix} Vdm \\ Vcm \end{pmatrix} = \begin{pmatrix} G1 & G2 \\ G3 & G4 \end{pmatrix} \cdot \begin{pmatrix} error1 \\ error2 \end{pmatrix}$$

The control parameter matrix, which was described above, includes the parameters G1, G2, G3, and G4. The common mode control signal, Vcm, and the differential mode control signal, Vdm, can be generated as:

Vcm=error1·G3+error2·G4, and

Vdm=error1·G1+error2·G2.

Thus, the control parameters G1-G4 define how the differential mode control signal, Vdm, and the common mode control signal, Vcm, change in response to changes in the error signals, error1 and error2. In an embodiment, the generation of the error signals, error1 and error2, includes an amplifier with frequency dependent behavior. Ultimately, the function is the specific linear combination of Vcm and Vdm to achieve orthogonal control. As described above, the relationship between control parameters G1 and G3 determines how Vcm and Vdm change in response to changes in the error signal, error1, such that a response is seen only at the first output, e.g., as Vout1/Iout1, and the relationship between control parameters G2 and G4 determines how Vcm and Vdm change in response to changes in the error signal, error2, such that a response is only seen at the second output, e.g., as Vout2/Iout2.

Figure 6B:
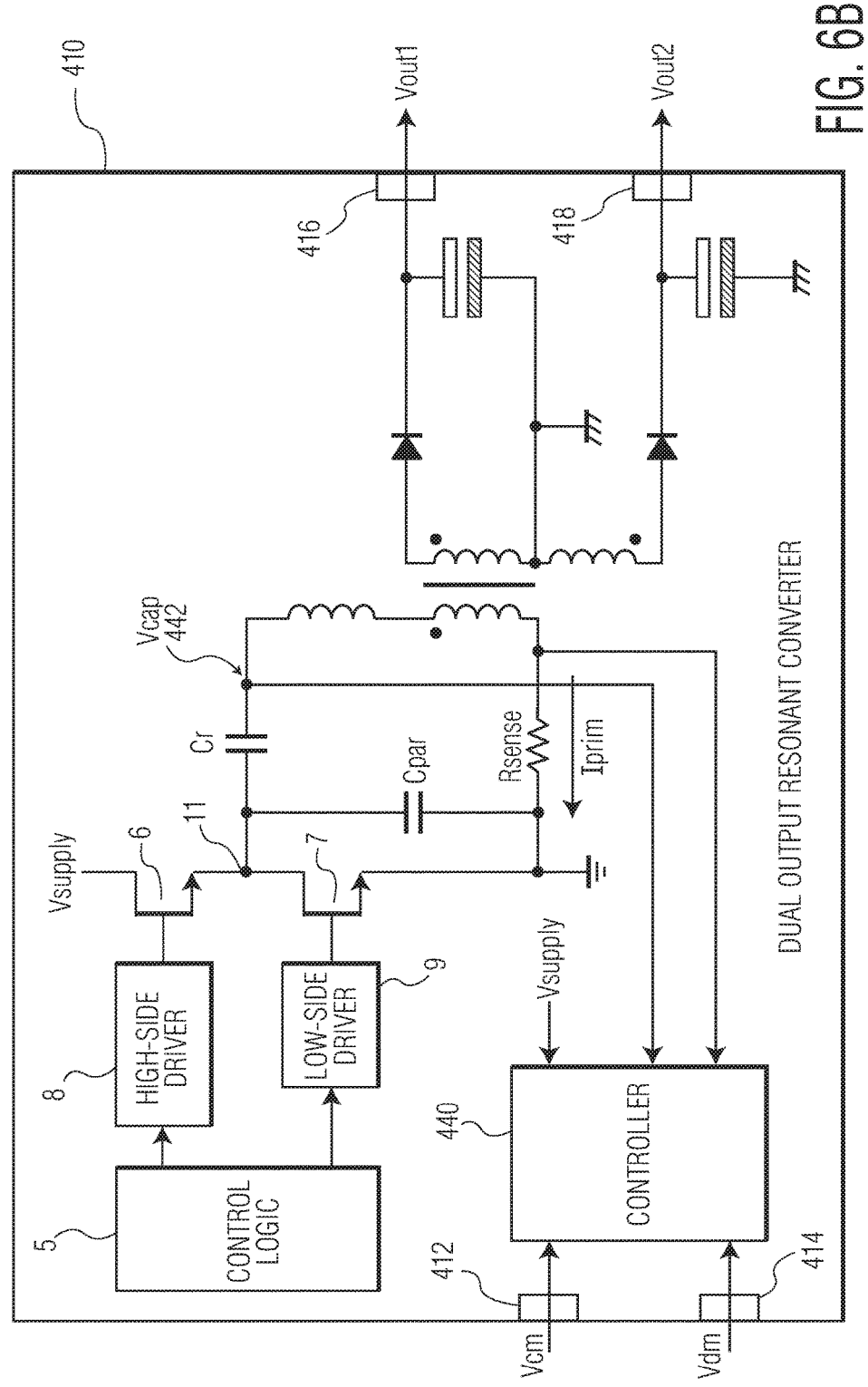
FIG. 6B depicts an embodiment of a dual output resonant converter that is configured for Vcap control.

FIG. 6B depicts an embodiment of a dual output resonant converter 410 that is configured for Vcap control. The dual output resonant converter is similar to the dual output resonant converter described with reference to FIG. 1. However, the dual output resonant converter shown in FIG. 6B includes a controller 440 that is configured to generate switch control signals in response to the common mode control signal, Vcm, the differential mode control signal, Vdm and the voltage at node 442. As shown in FIG. 6B, node 442 is identified as the "Vcap" node, e.g., the node at which Vcap is measured. In the circuit of FIG. 6B, the voltage at Vcap can be expressed as: Vcap=Vhb−Vcr, where Vhb is the voltage at the half bridge node 11 and Vcr is the voltage across the resonant capacitor, Cr. In operation, the output, Vout1, at the first output 416 and the output, Vout2, at the second output 418 are fed back to the dual output controller through the compare units as described above with reference to FIGS. 2 and 6A. The common mode control signal, Vcm, and the differential mode control signal, Vdm, are generated by the dual output controller in response to the error signals, error1 and error2. The common mode control signal, Vcm, and the differential mode control signal, Vdm, are provided to the controller of the dual output resonant converter and used to generate switch control signals that are used by the control logic 5 to control the switching of the high-side and low-side switches 6 and 7 such that the output voltage, Vout1 and Vout2, at the first and second outputs, respectively, are controlled independent of each other.

The power converter 300 shown in FIG. 6A can also be configured for Vcr control. When operating according to Vcr control, the dual output controller 320 generates the common mode control signal, Vcr_cm, and the differential mode control signal, Vcr_dm, in response to the error signals, error1 and error2. To generate the common mode control signal, Vcr_cm, and the differential mode control signal, Vcr_dm, the dual output controller is configured with a control parameter matrix of:

$$\begin{pmatrix} G1 & G2 \\ G3 & G4 \end{pmatrix}$$

and the control function can be expressed as:

$$\begin{pmatrix} Vcr\_dm \\ Vcr\_cm \end{pmatrix} = \begin{pmatrix} G1 & G2 \\ G3 & G4 \end{pmatrix} \cdot \begin{pmatrix} error1 \\ error2 \end{pmatrix}$$

The control parameter matrix, which was described above, includes the parameters G1, G2, G3, and G4. The common mode term, Vcr_cm, and the differential mode term, Vcr_dm, are generated as:

Vcr_cm=error1·G3+error2·G4; and

Vcr_dm=error1·G1+error2·G2.

Figure 6C:
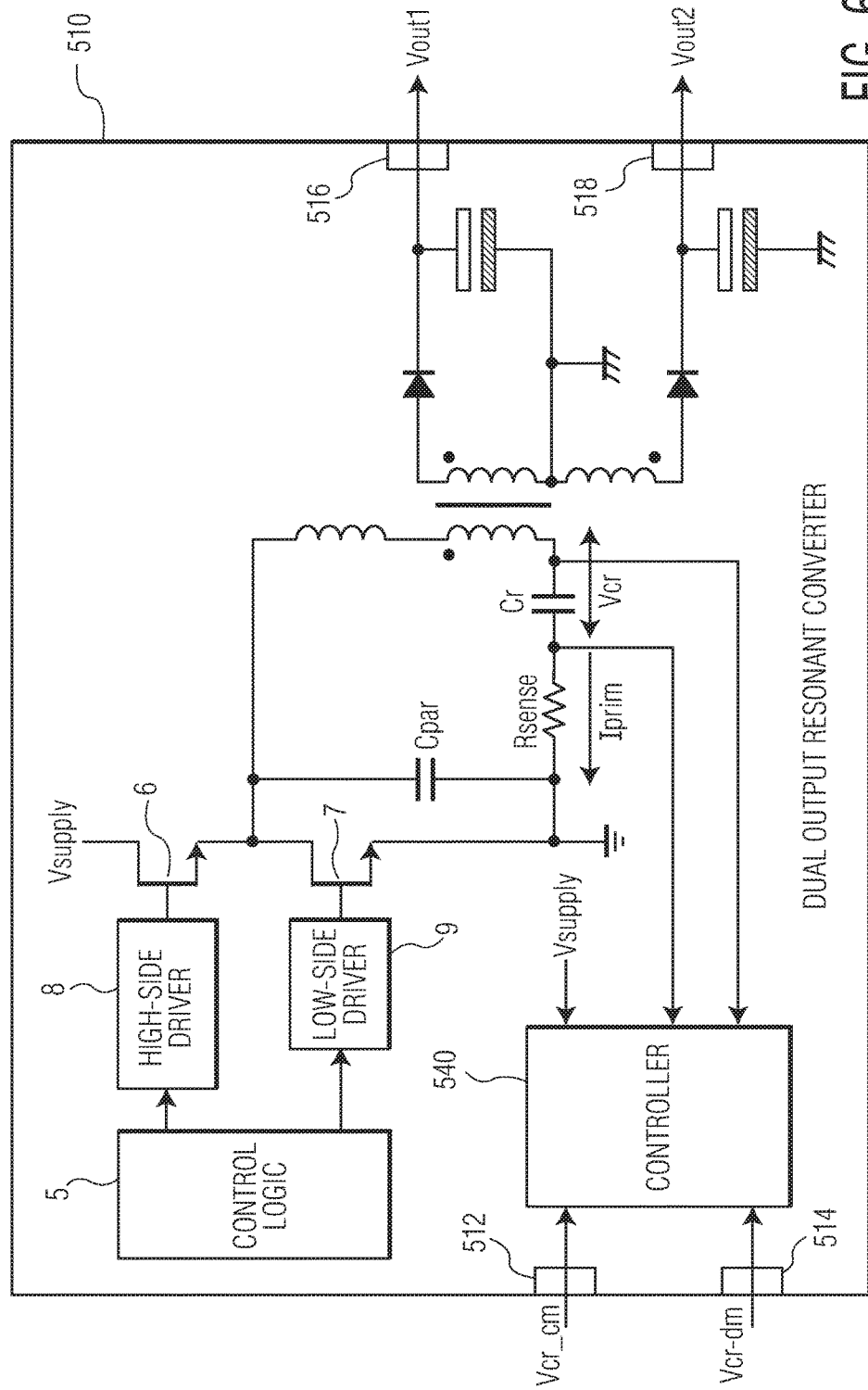
FIG. 6C is a block diagram of an example of a power converter that is configured for Vcr control.

FIG. 6C depicts an embodiment of a dual output resonant converter 510 that is configured for Vcr control. The dual output resonant converter is similar to the dual output resonant converter described with reference to FIG. 1. However, the dual output resonant converter shown in FIG. 6C includes a controller 540 that is configured to generate switch control signals in response to the common mode control signal, Vcr_cm, the differential mode control signal, Vcr_dm, and the voltage across the resonant capacitor, Vcr. As shown in FIG. 6C, the voltage is measured across the resonant capacitor, Cr, and is identified as Vcr. In operation, the output, Vout1, at the first output 516 and the output, Vout2, at the second output 518 are fed back to the dual output controller through the compare units as described above with reference to FIGS. 2 and 6A. The common mode control signal, Vcr_cm, and the differential mode control signal, Vcr_dm, are generated by the dual output controller in response to the error signals, error1 and error2. The common mode control signal, Vcr_cm, and the differential mode control signal, Vcr_dm, are provided to the controller of the dual output resonant converter and used to generate switch control signals that are used by the control logic 5 to control the switching of the high-side and low-side switches 6 and 7 such that the output voltage, Vout1 and Vout2, at the first and second outputs, respectively, are controlled independent of each other.

Figure 7:
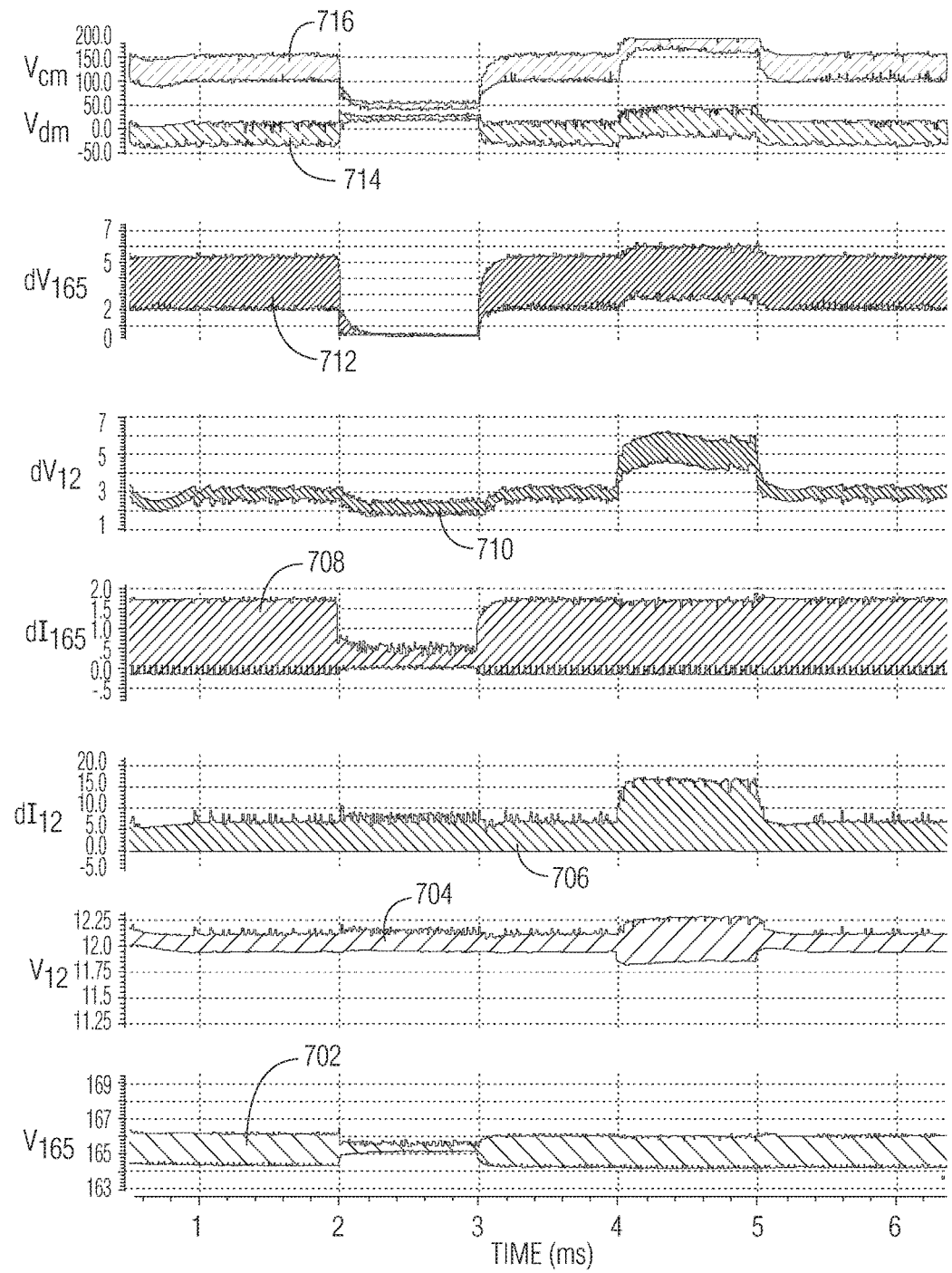
FIG. 7 is a graph of a simulation performed using the above-described techniques.

As described above, a desirable feature of the power converter is the ability to be able to independently control the voltage and/or current at the first and second outputs to independently control the amount of power supplied by the first and second outputs. FIG. 7 is a graph of a simulation performed using the above-described techniques. From bottom to top: the first graph 702 depicts the voltage at the 165V output, including a load step down from 500 mA to 100 mA at 2.0 milliseconds (ms); the second graph 704 depicts the voltage at the 12V output, including a load step up from 200 mA to 500 mA at 4.0 ms; the third graph 706 depicts a change in current that occurs in the output side diodes of the 12V output with an increase in current that corresponds to the load step up at 4.0 ms; the fourth graph 708 depicts a change in current that occurs in the output side diodes of the 165V output with a decrease in current that corresponds to the load step down at 2.0 ms; the fifth graph 710 depicts one of the error signals (e.g., the error signal error1) for the 12V output, with a significant change in the error signal that corresponds to the load step up at 4.0 ms; the sixth graph 712 depicts one of the error signals (e.g., the error signal, error2) for the 165V output, with a significant change in the error signal that corresponds to the load step down at 2.0 ms; the seventh graph 714 depicts one of the control signals (e.g., the differential mode control signal, Vdm), with significant changes in the control signal that corresponds to the load steps at 2.0 ms and at 4.0 ms; and the eighth graph 716 depicts one of the control signals (e.g., the common mode control signal, Vcm), with significant changes in the control signal that correspond to the load steps at 2.0 ms and at 4.0 ms. As can be seen from FIG. 7, the voltage at the 12V output is not changed by the load step down that occurs at the 165V output at 2.0 ms and likewise, the voltage at the 165V output is not changed by the load step up that occurs at the 12V output at 4.0 ms. Thus, the two outputs are independently controllable using control signals (e.g., the common mode control signal, Vcm, and the differential mode control signal, Vdm) that are generated in response to the error signals, error1 and error2 (e.g., as a function of the current, Iout1 and Iout2 at the first and second outputs).

Figure 8:
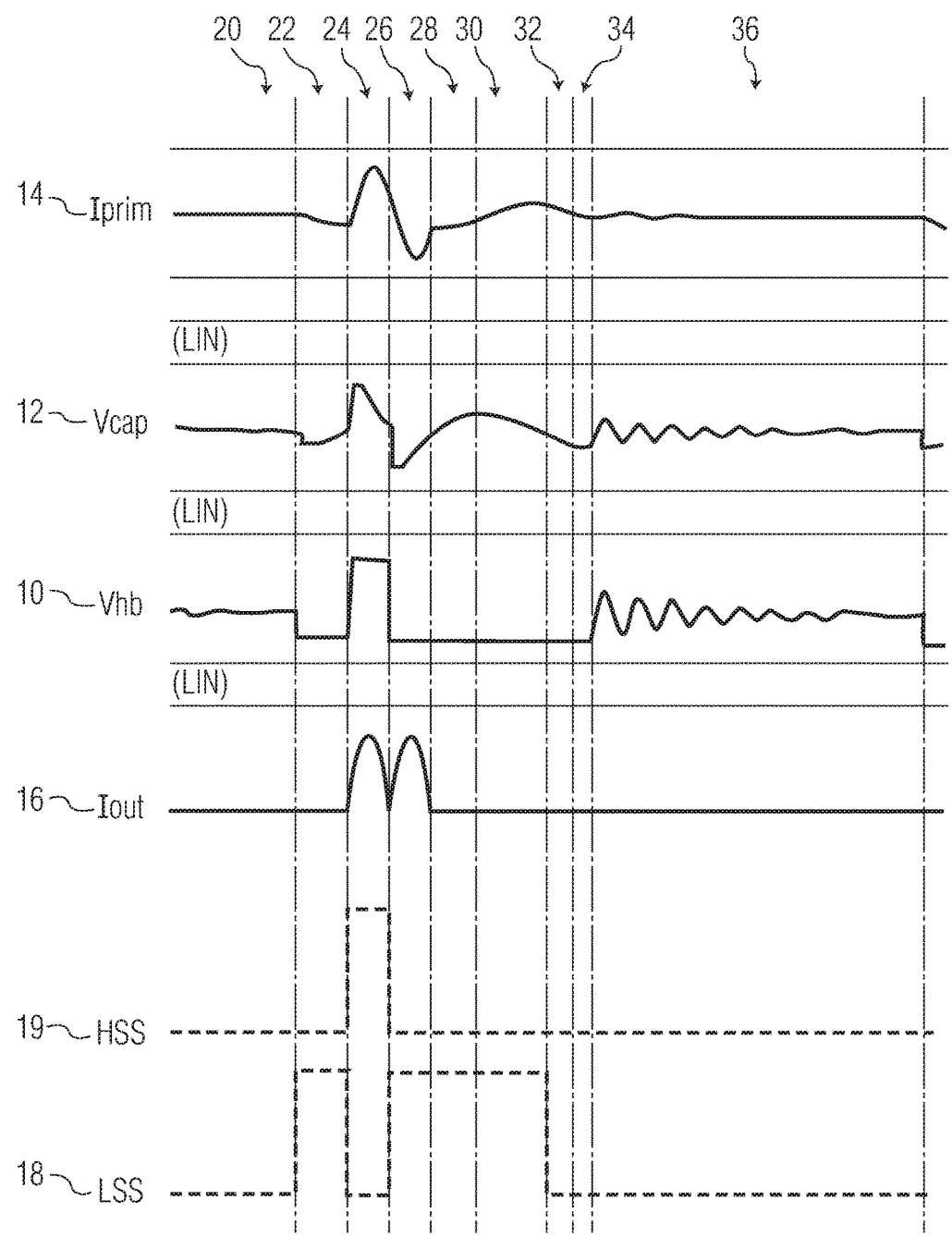
FIG. 8 is a graph of various signal values in resonant converter over a number of time intervals.

The techniques described above can be used in combination with a low power mode, as disclosed European Patent Application No. 15159086.6 (Published as EP 3 068 027 A1, on Mar. 13, 2015) and U.S. Pat. No. 8,339,817, which are incorporated by reference herein, where the common mode control signal, Vcm, and the differential mode control signal, Vdm, define the converted energy during the conversion interval as part of a low power mode cycle. FIG. 8 is a graph of various signal values in a resonant converter over time intervals. The signals include the current in the resonant tank, Iprim, the voltage in the resonant tank, Vcap, the voltage at the half bridge node, Vhb, the output current, Iout, and the state of the high-side switch, HSS, and the state of the low-side switch, LSS. The time intervals include time intervals 20, 22, 24, 26, 28, 30, 32, 34, and 36. In an embodiment, during interval 24, energy is delivered to one of the two outputs of the dual output resonant converter and during interval 26, energy is delivered to the other of the two outputs of the dual output resonant converter. With the common mode control signal, Vcm, and the differential mode control signal, Vdm, related to the voltage at node "Vcap," the difference and sum of the currents in the output can be controlled.

The above described techniques for controlling a power converter that includes a dual output resonant converter are also applicable to resonant converters that are controlled based on a voltage change across the resonant capacitor as disclosed in U.S. Pat. No. 9,065,350, which may be referred to as deltaVcr control.

Figure 9:
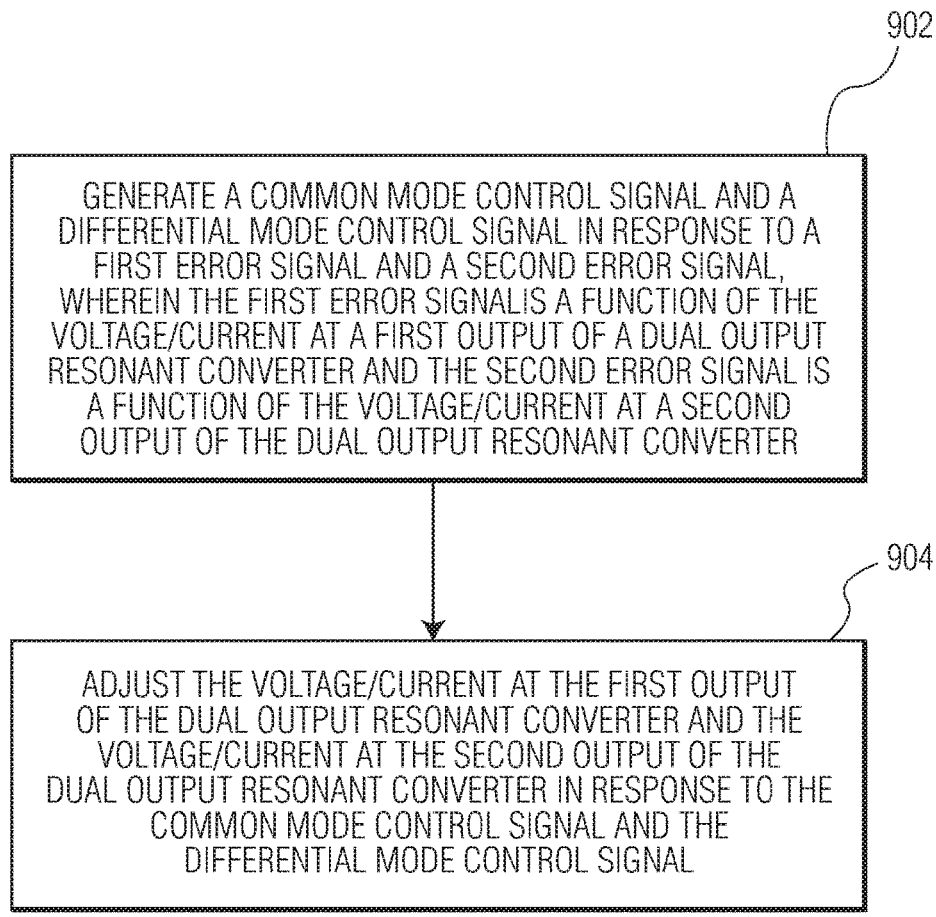
FIG. 9 is a process flow diagram of a method for controlling a power converter.

FIG. 9 is a process flow diagram of a method for controlling a power converter. At block 902, the method involves generating a common mode control signal and a differential mode control signal in response to a first error signal and a second error signal, wherein the first error signal is a function of the voltage/current at a first output of a dual output resonant converter and the second error signal is a function of the voltage/current at a second output of the dual output resonant converter. At block 904, the method involves adjusting the voltage/current at the first output of the dual output resonant converter and the voltage/current at the second output of the dual output resonant converter in response to the common mode control signal and the differential mode control signal.

Although the outputs of the resonant converter are described in terms of output voltages, Vout1 and Vout2, it should be understood that the control techniques described herein are applicable to and may be implemented in response to the voltage at the outputs, Vout1 and Vout2, the currents at the outputs, Iout1 and Iout2, the power at outputs, Pout1 and Pout2, or some combination thereof. In some instances, the term "voltage/current" is used to refer to the voltage and/or the current, such that the term may refer to the voltage, may refer to the current, or may refer to both the voltage and the current. The term may also refer to power, which is a function of voltage and/or current.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk.

Current examples of optical disks include a compact disk with read only memory (CD-ROM), a compact disk with read/write (CD-RV), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A power converter comprising:
   a dual output resonant converter including a first output, a second output, a common mode control input, and a differential mode control input,
   wherein a voltage/current at the first output and a voltage/current at the second output are controlled in response to a common mode control signal received at the common mode control input and a differential mode control signal received at the differential mode control input; and
   a dual output controller including a first error signal input, a second error signal input, a common mode control output, and a differential mode control output,
   wherein the dual output controller is configured to generate the common mode control signal and the differential mode control signal in response to a first error signal received at the first error signal input and a second error signal received at the second error signal input,
   wherein the first error signal is a function of the voltage/current at the first output and the second error signal is a function of the voltage/current at the second output, and
   wherein the common mode control signal is output from the common mode control output and the differential mode control signal is output from the differential mode control output;
   wherein (VcapH+VcapL)/2 of the dual output resonant converter is a function of the common mode control signal and Vbus/2−(VcapH−VcapL)/2 of the dual output resonant converter is a function of the differential mode control signal; and
   wherein VcapH is a voltage at a specific node in a resonant tank of the dual output resonant converter when a high side switch of the dual output resonant converter is on and VcapL is a voltage at a specific node in the resonant tank of the dual output resonant converter when a low side switch of the dual output resonant converter is on.

2. The power converter of claim 1,
   wherein the dual output controller is configured to generate the common mode control signal and the differential mode control signal in response to the first error signal and the second error signal by precalculating a control variable matrix and generating the common mode control signal and the differential mode control signal as a function of the first and second error signals and the control variable matrix.

3. The power converter of claim 2,
   wherein the control variable matrix includes variables G1, G2, G3, and G4, wherein the common mode control signal and the differential mode control signal are generated as:

Vcm=first error signal·G3+second error signal·G4; and
Vdm=first error signal·G1+second error signal·G2.

4. The power converter of claim 1, wherein the dual output controller is configured for Vcap control.

5. The power converter of claim 1,
   wherein Vbus/2−(VcrH+VcrL)/2 of the dual output resonant converter is the function of the common mode control signal and (VcrH−VcrL)/2 of the dual output resonant converter is the function of the differential mode control signal,
   wherein VcrH is a voltage across a resonant capacitor of the dual output resonant converter when the high side switch of the dual output resonant converter is on and VcrL is a voltage across the resonant capacitor of the dual output resonant converter when the low side switch of the dual output resonant converter is on.

6. The power converter of claim 5, wherein the dual output controller is configured for Vcr control.

7. The power converter of claim 1, further comprising
   a first compare circuit that generates the first error signal in response to a comparison between the voltage/current at the first output and a first reference voltage/current and
   a second compare circuit that generates the second error signal in response to a comparison between the voltage/current at the second output and a second reference voltage/current.

8. A power supply comprising the power converter of claim 1, further including a low power mode.

9. A power supply comprising the power converter of claim 1,
   wherein the dual output resonant converter is configured to provide the voltage at the first output of approximately 12 volts and to provide the voltage at the second output of approximately 165 volts.

10. A power supply for a display device comprising the power converter of claim 1,
    wherein the dual output resonant converter is configured to provide a voltage at the first output of approximately 12 volts and to provide a voltage at the second output to drive LEDs strings for backlighting of the display device.

11. A method for controlling a power converter, the method comprising:
    generating a common mode control signal and a differential mode control signal in response to a first error signal and a second error signal,
    wherein the first error signal is a function of a voltage/current at a first output of a dual output resonant converter and the second error signal is a function of a voltage/current at a second output of the dual output resonant converter; and
    adjusting the voltage/current at the first output of the dual output resonant converter and the voltage/current at the second output of the dual output resonant converter in response to the common mode control signal and the differential mode control signal;
    wherein (VcapH+VcapL)/2 of the dual output resonant converter is a function of the common mode control signal and Vbus/2−(VcapH−VcapL)/2 of the dual output resonant converter is a function of the differential mode control signal,
    wherein VcapH is a voltage at a specific node in a resonant tank of the dual output resonant converter when a high side switch of the dual output resonant converter is on and VcapL is a voltage at a specific node in the resonant tank of the dual output resonant converter when a low side switch of the dual output resonant converter is on.

12. The method of claim 11 wherein generating the common mode control signal and the differential mode control signal in response to the first error signal and the second error signal comprises precalculating a control variable matrix and generating the common mode control signal and the differential mode control signal as a function of the first and second error signals and the control variable matrix.

13. The method of claim 12 wherein the control variable matrix includes variables G1, G2, G3, and G4, and wherein the common mode control signal and the differential mode control signal are generated as:

Vcm=first error signal·G3+second error signal·G4; and
Vdm=first error signal·G1+second error signal·G2.

14. The method of claim 11, wherein Vbus/2+(VcrH+VcrL)/2 of the dual output resonant converter is the function of the common mode control signal and (VcrH−VcrL)/2 of the dual output resonant converter is the function of the differential mode control signal,
wherein VcrH is a voltage across a resonant capacitor of the dual output resonant converter when the high side switch of the dual output resonant converter is on and VcrL is a voltage across the resonant capacitor of the dual output resonant converter when the low side switch of the dual output resonant converter is on.

15. The method of claim 11 wherein the first error signal is generated in response to a comparison between the voltage/current at the first output and a first reference voltage/current and the second error signal is generated in response to a comparison between the voltage/current at the second output and a second reference voltage/current.

16. A power converter comprising:
a dual output resonant converter including a first output, a second output, a common mode control input, and a differential mode control input,
wherein a voltage/current at the first output and a voltage/current at the second output are controlled in response to a common mode control signal received at the common mode control input and a differential mode control signal received at the differential mode control input; and
a dual output controller including a first error signal input, a second error signal input, a common mode control output, and a differential mode control output,
wherein the dual output controller is configured to generate the common mode control signal and the differential mode control signal in response to a first error signal received at the first error signal input and a second error signal received at the second error signal input,
wherein the first error signal is a function of the voltage/current at the first output and the second error signal is a function of the voltage/current at the second output, and
wherein the common mode control signal is output from the common mode control output and the differential mode control signal is output from the differential mode control output
wherein Vbus/2+(VcrH+VcrL)/2 of the dual output resonant converter is a function of the common mode control signal and (VcrH+VcrL)/2 of the dual output resonant converter is a function of the differential mode control signal,
wherein VcrH is a voltage across a resonant capacitor of the dual output resonant converter when a high side switch of the dual output resonant converter is on and VcrL is a voltage across the resonant capacitor of the dual output resonant converter when a low side switch of the dual output resonant converter is on.

17. A method for controlling a power converter, the method comprising:
generating a common mode control signal and a differential mode control signal in response to a first error signal and a second error signal,
wherein the first error signal is a function of a voltage/current at a first output of a dual output resonant converter and the second error signal is a function of a voltage/current at a second output of the dual output resonant converter; and
adjusting the voltage/current at the first output of the dual output resonant converter and the voltage/current at the second output of the dual output resonant converter in response to the common mode control signal and the differential mode control signal
wherein Vbus/2−(VcrH +VcrL)/2 of the dual output resonant converter is a function of the common mode control signal and (VcrH−VcrL)/2 of the dual output resonant converter is a function of the differential mode control signal,
wherein VcrH is a voltage across a resonant capacitor of the dual output resonant converter when a high side switch of the dual output resonant converter is on and VcrL is a voltage across the resonant capacitor of the dual output resonant converter when a low side switch of the dual output resonant converter is on.

* * * * *